(12) United States Patent
Burggraaf et al.

(10) Patent No.: US 10,451,197 B2
(45) Date of Patent: Oct. 22, 2019

(54) SYSTEM FOR GUIDING A PLURALITY OF ADJACENTLY ARRANGED CONDUITS

(71) Applicant: Burggraaf Beheer B.V., Vaassen (NL)

(72) Inventors: Lars Daniel Burggraaf, Zwolle (NL); Wouter Nicolas Andries Burggraaf, Vaassen (NL)

(73) Assignee: Burggraaf Beheer B.V., Vaassen (NL)

( * ) Notice: Subject to any disclaimer, the term of this patent is extended or adjusted under 35 U.S.C. 154(b) by 0 days.

(21) Appl. No.: 15/524,562

(22) PCT Filed: Nov. 2, 2015

(86) PCT No.: PCT/NL2015/050765
§ 371 (c)(1),
(2) Date: May 4, 2017

(87) PCT Pub. No.: WO2016/072848
PCT Pub. Date: May 12, 2016

(65) Prior Publication Data
US 2017/0321822 A1    Nov. 9, 2017

(30) Foreign Application Priority Data
Nov. 4, 2014  (NL) ..................................... 1041033

(51) Int. Cl.
*F16L 3/22*    (2006.01)
*F16L 3/23*    (2006.01)
(Continued)

(52) U.S. Cl.
CPC ................... *F16L 3/23* (2013.01); *F16L 3/26* (2013.01); *H02G 3/0456* (2013.01)

(58) Field of Classification Search
CPC ...................................... F16L 3/23; F16L 3/26
(Continued)

(56) References Cited

U.S. PATENT DOCUMENTS

| | | | |
|---|---|---|---|
| 2,238,532 A | | 4/1941 | Nothe |
| 2,397,291 A | * | 3/1946 | Robertson ............... F16L 3/223 |
| | | | 211/120 |

(Continued)

FOREIGN PATENT DOCUMENTS

| | | |
|---|---|---|
| DE | 7336761 U | 1/1974 |
| DK | 108366 C | 11/1967 |

(Continued)

OTHER PUBLICATIONS

International Search Report and Written Opinion received in Patent Cooperation Treaty Application No. PCT/NL2015/050765, dated Mar. 10, 2016, 10 pages.

*Primary Examiner* — Gwendolyn W Baxter
(74) *Attorney, Agent, or Firm* — Mirna Abyad

(57) ABSTRACT

System for guiding a plurality of adjacently arranged conduits (1), which system comprises a frame configuration (2) which is configured to guide the conduits and to form a connection with an attachment surface or attachment points, wherein the system further comprises locking elements (3), which extend transversely to the conduits, wherein the locking elements are able to provide a releasable connection with the frame configuration, and wherein the system further comprises spiral locking springs (4), which extend transversely to the conduits, wherein the spiral locking springs are configured to secure the arrangement of the adjacently arranged conduits, in cooperation with the locking elements. For example, the frame configuration is a ladder-shaped frame or comprises one or more frame sections (5, 5'). The locking elements may extend on the inner side or the outer side of the spiral locking springs.

3 Claims, 2 Drawing Sheets

(51) Int. Cl.
*F16L 3/26* (2006.01)
*H02G 3/04* (2006.01)

(58) Field of Classification Search
USPC .................................................. 248/49, 68.1
See application file for complete search history.

(56) References Cited

U.S. PATENT DOCUMENTS

| | | | |
|---|---|---|---|
| 3,233,851 A | | 2/1966 | Lemieux et al. |
| 3,791,613 A | * | 2/1974 | Nollen ................. H02G 3/0456 248/49 |
| 4,886,173 A | * | 12/1989 | Goulter ................. A47F 13/085 211/120 |
| 5,842,583 A | * | 12/1998 | Kasa-Djukic ............ B25H 3/04 211/65 |
| 8,558,112 B2 | * | 10/2013 | Pawluk ................. H02G 3/0437 174/68.1 |
| 9,866,000 B2 | * | 1/2018 | Mostazo Oviedo ......................... H02G 3/0456 |
| 9,887,523 B2 | * | 2/2018 | Tally ........................ B21J 15/02 |
| 2003/0178535 A1 | * | 9/2003 | Jette ..................... H02G 3/0443 248/49 |
| 2010/0019106 A1 | | 1/2010 | Sisley |
| 2015/0322987 A1 | * | 11/2015 | Romano .................. F16L 3/26 248/49 |
| 2016/0204586 A1 | * | 7/2016 | Tally ........................ B21J 15/02 248/68.1 |

FOREIGN PATENT DOCUMENTS

| | | |
|---|---|---|
| WO | 8804486 A1 | 6/1988 |
| WO | 9100973 A1 | 1/1991 |
| WO | 9608063 A1 | 3/1996 |

* cited by examiner

SYSTEM FOR GUIDING A PLURALITY OF ADJACENTLY ARRANGED CONDUITS

RELATED APPLICATION

This application is a national phase application of PCT/NL2015/050765, filed Nov. 2, 2015, which claims priority to Netherlands Application No. 1041033 filed Nov. 4, 2014.

The invention relates to a system for guiding a plurality of adjacently arranged cables, pipes, hoses, etc., hereinafter referred to as conduits.

In particular, the object of the invention is to provide a system wherein the (exterior of the) pipes, cables, tubes, hoses, etc. can be cleaned effectively and thoroughly, which is essential when these pipes, etc. are installed in an environment where food is produced, or processed, or where other processes are executed in which hygiene is essential.

For guiding conduits etc., (standard) cable trays with cable ties are known among others. Disadvantageously, the conduits in these known trays cannot be properly cleaned from the outside. Therefore, the object of the invention is to provide a system, wherein the adjacently arranged conduits are maintained at a mutual distance, wherein a orderly arrangement of the conduits is obtained, horizontally or vertically (or possibly inclined at an angle), and wherein the conduits are easily accessible from the outside, so that the conduits may be cleaned dry and/or wet with little effort, thereby considerably improving the hygienic operations.

According to the invention a system is provided for guiding a plurality of adjacently arranged cables, pipes etc., hereinafter referred to as conduits, which system comprises a frame configuration which is configured to guide the conduits and to form a connection with an attachment surface or attachment points, wherein the system further comprises locking elements, which extend transversely with respect to the longitudinal direction of the conduits, wherein the locking elements are able to provide a releasable (detachable) connection with the frame configuration, and wherein the system further comprises spiral locking springs, which extend transversely with respect to the longitudinal direction of the conduits, wherein the spiral locking springs are configured to secure the arrangement of the adjacently arranged conduits, optionally in cooperation with the locking elements.

By providing releasable locking elements and releasable spiral locking springs, locally the conduits can be easily removed and cleaned and subsequently be reattached (locked). Additionally new conduits may be added with little effort and old conduits may be easily removed.

In a first embodiment, the frame configuration comprises a ladder-shaped frame having two or more frame sections extending in the longitudinal direction of the conduits, and a plurality of transverse elements extending transversely with respect to the longitudinal direction of the conduits between the frame sections, which transverse elements are provided and configured as support for the conduits, and wherein the locking elements and the frame sections are configured such that, after (detachably) connecting the locking elements to the frame sections, the locking elements extend above the conduits, transverse to the longitudinal direction of the conduits. Preferably, the locking elements and the frame sections are configured such that, after connecting the locking elements to the frame sections, the locking elements are located at about the same level as said transverse elements, which transverse elements are provided and configured as support for the conduits, whereby the locking elements slightly press down the conduits, so that the conduits are held securely in place ("locked"). Preferably the spiral locking springs are configured to be able to be provided with their helical windings between the conduits, before or after mounting the releasable locking elements. As a result, cable ties to hold the conduits in place are now superfluous.

In a second embodiment the frame configuration comprises one or more frame sections which extend in longitudinal direction of the conduits, and which are configured to be releasably connected with one or more locking elements, and wherein additionally the frame sections comprise one or more spiral locking springs, which extend transversely with respect to the longitudinal direction of the conduits, or the frame sections are configured to be connectable with one or more spiral locking springs.

In use in both embodiments, the locking elements extend on the inner side or the outer side of the spiral locking springs.

The invention will be hereinafter further explained by means of the description of the figures.

Figure 1:
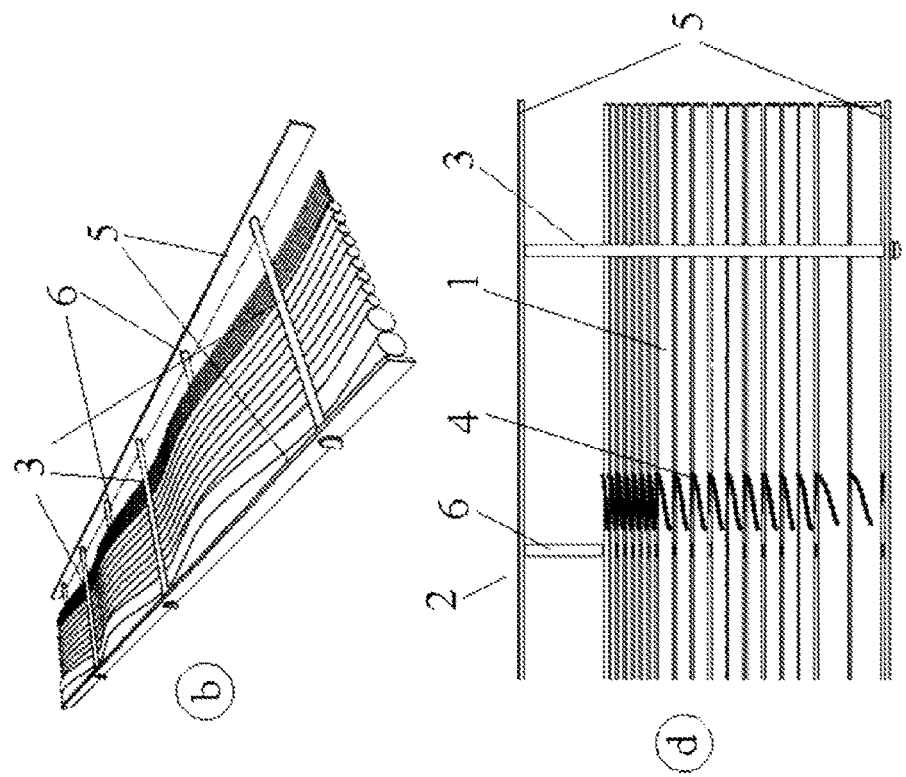
FIGS. 1a-1d show a first embodiment of a system according to the invention.
Figure 1:
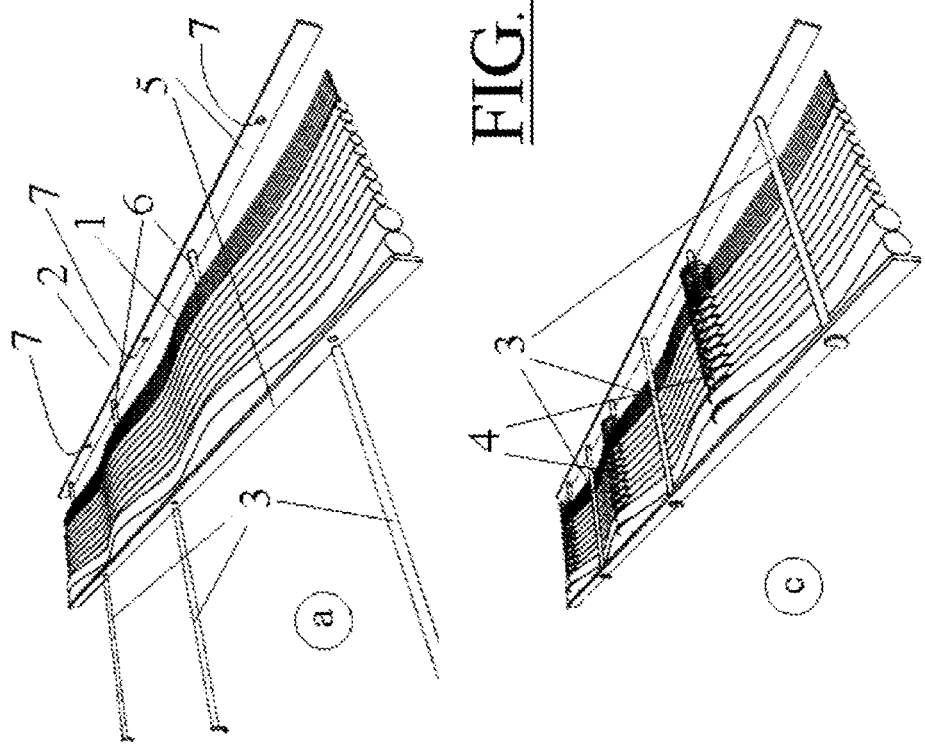

Both the FIGS. 1a-1d as well as 2a-2d show a system for guiding a plurality of adjacently arranged cables, pipes etc., hereinafter referred to as conduits 1, which system comprises a frame configuration 2 which is configured to guide the conduits 1 and to form a connection with an attachment surface (e.g. a wall) or attachment points (for example, on the frame of a production plant), wherein the system further comprises locking (retaining) elements 3, which extend transversely with respect to the longitudinal direction of the conduits, wherein the locking elements are able to provide a releasable connection with the frame configuration 2, and wherein the system further comprises spiral locking (retaining) springs 4, which extend transversely with respect to the longitudinal direction of the conduits, wherein in cooperation with the locking elements the spiral locking springs are configured to secure a neat orderly arrangement of the adjacently arranged conduits. As a result, cleaning of the these conduits is more easy, either by locally temporarily removing the locking elements 3 and/or the locking springs 4, for example while performing a "thorough cleaning", or by maintaining the connection of the locking elements 3 and/or the locking springs 4 with the frame configuration 2, for example, when carrying out a mid-term "small maintenance". When performing a "thorough cleaning" or during replacement, removal or adding of conduits, due to the releasable locking elements and the releasable spiral locking springs, the conduits are easily locally disconnected and cleaned and then again are easily (re)attached (locked) onto the frame configuration.

FIGS. 1a-1d show a first embodiment of the system according to the invention, wherein the frame configuration 2 comprises a ladder-shaped frame having two or more frame sections 5 extending in the longitudinal direction of the conduits, and a plurality of transverse elements 6 extending transversely with respect to the longitudinal direction of the conduits between the frame sections, which transverse elements are provided and configured as support for the conduits 1. The releasable locking elements 3 and the frame sections 5 are configured such that—by means of, for example, openings 7 in the frame sections 5—the locking elements 3, after being (detachably or releasably) connected with the frame sections 5, extend above the conduits 1, transverse to the longitudinal direction of the conduits. Preferably, as is also shown in FIGS. 1a-1d, the locking elements 3 and the frame sections 5 are configured such that, after connecting the locking elements to the frame sections 5, the locking elements 3 are located at about the same level as said transverse elements 6, which transverse elements are provided and configured for supporting the conduits 1. As a result the locking elements 3 (have to) slightly press down the conduits 1, so that the conduits due to the clamping force exerted—are held securely in place ("are locked"). The spiral locking springs 4 are configured to be able to be provided with their helical windings between the conduits 1, before or after mounting the releasable locking elements 3. In FIGS. 1a-1d the locking springs 4 are mounted after the locking elements 3 are inserted into the frame configuration 2. However, it is also possible (although somewhat more difficult) to firstly insert the locking springs 4 between the conduits, approximately at the location of the openings 7, and then subsequently insert the locking elements 3 inwardly, through the inside of the helical windings.

Figure 2:
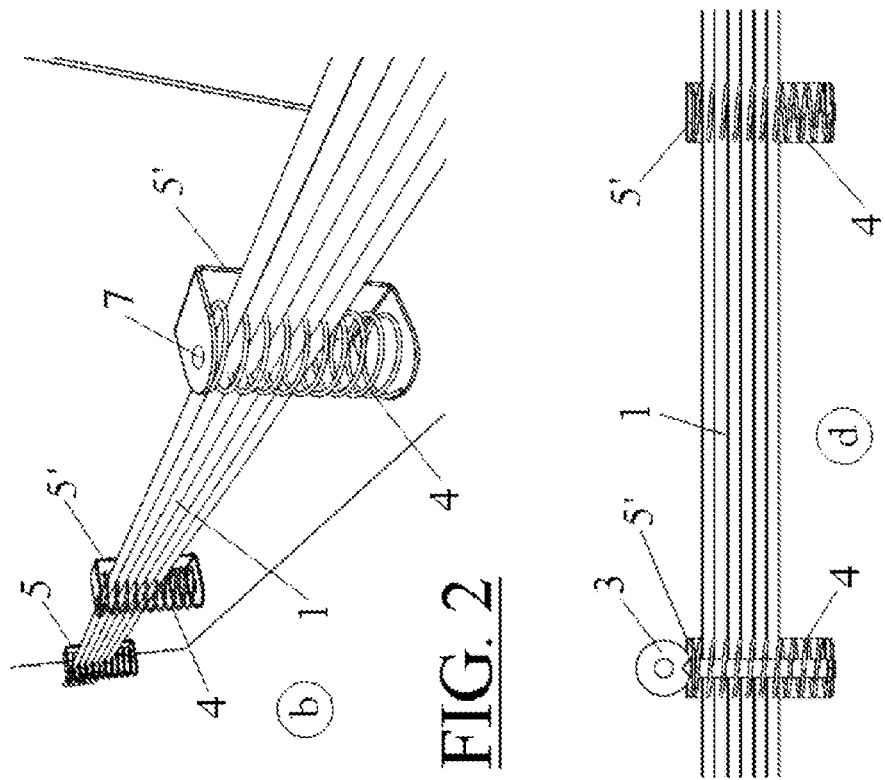
FIGS. 2a-2d show a second embodiment of a system according to the invention.
Figure 2:
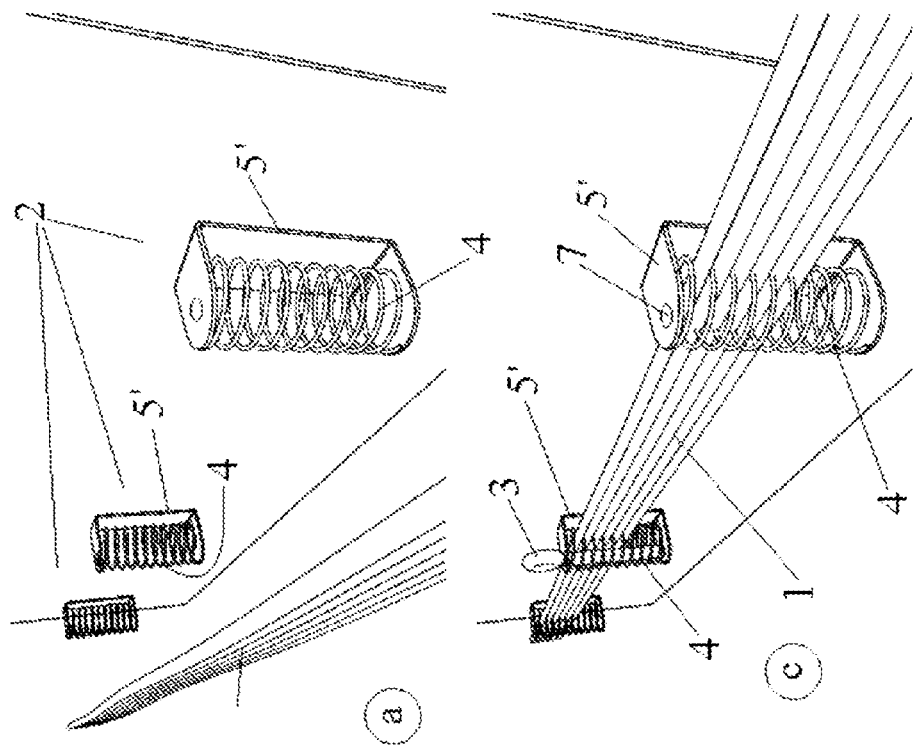

In a second embodiment, the frame configuration 2 comprises one or as proposed in the FIGS. 2a-2d a plurality of (separate) frame sections 5', which (together) extend in the longitudinal direction of the conduits 1, and which are configured to be able to be releasably connected with one (as in the FIGS. 2a-2d) or optionally more locking elements 3. The frame sections additionally comprise one (as in the FIGS. 2a-2d) or optionally more spiral locking springs 4 (which optionally are or may be releasably connected therewith), which springs extend transversely to the longitudinal direction of the conduits 1. The locking springs do not necessarily have to be mounted onto the frame. They may also be used to guide two or more conduits, which are suspended in a free space between two attachment points; for example, with a reciprocating motion or a small bridging to a field object.

In both embodiments, as stated earlier, the locking elements 3 may extend in use on the inner side or the outer side of the spiral locking springs 4. In FIGS. 1a-1d, the locking elements 3 are provided outside of the locking springs 4 (the locking springs 4 are only provided there, after inserting the locking elements 3 into the openings 7 of frame sections 5), whereas in FIGS. 2a-2d, the locking elements 3 are provided within the locking springs 4 after the conduits 1 are pressed into the locking springs 4 (which are already connected to the frame sections 5'). The locking elements 3 (corresponding to the embodiment of FIGS. 1a-1d) are connected with the frame sections 5' by means of openings 7 in the frame sections 5', in which openings the locking elements 3 are inserted.

The invention claimed is:

1. A guiding apparatus for guiding a plurality of conduits, comprising:
    a frame configuration to guide the conduits and to form a connection with an attachment surface or attachment points, wherein the frame configuration comprises a ladder-shaped frame having two or more frame sections extending in a longitudinal direction of the conduits, and wherein the ladder-shaped frame comprises a plurality of transverse elements extending transversely with respect to the longitudinal direction of the conduits between the frame sections, which transverse elements are provided and configured as support for the conduits;
    locking elements capable of extending transversely with respect to the longitudinal direction of the conduits, wherein the locking elements are resealably connected to the frame sections of the frame configuration by means of openings in the frame sections, the locking elements are inserted in the openings, wherein the locking elements and the openings in the frame sections are configured such that, after connecting the locking elements to the openings of the frame sections, the locking elements extend above the conduits, transverse to the longitudinal direction of the conduits, and the locking elements are located at about the same level as said transverse elements.

2. The guiding apparatus of claim 1, wherein spiral locking springs are provided with their helical windings between the conduits.

3. The guiding apparatus of claim 2, wherein the spiral locking springs are inserted between the conduits at the location of the openings in the frame sections and the locking elements are inserted in the openings and extending through the inside of the helical windings.

* * * * *